United States Patent [19]

Hodge

[11] Patent Number: 4,591,082
[45] Date of Patent: * May 27, 1986

[54] OPTICAL FIBER SEVERING DEVICE AND METHOD

[75] Inventor: Malcolm H. Hodge, Simsbury, Conn.

[73] Assignee: TRW Inc., Redondo Beach, Calif.

[*] Notice: The portion of the term of this patent subsequent to Mar. 5, 2002 has been disclaimed.

[21] Appl. No.: 548,964

[22] Filed: Nov. 7, 1983

[51] Int. Cl.⁴ .............................................. C03B 37/16
[52] U.S. Cl. ......................................... 225/2; 225/96; 225/101; 225/106
[58] Field of Search .................... 225/2, 96.5, 96, 101, 225/106; 65/10.2

[56] References Cited

U.S. PATENT DOCUMENTS

| | | | |
|---|---|---|---|
| 3,934,773 | 1/1976 | Chinnock et al. | 225/2 |
| 3,981,422 | 9/1976 | Moore | 225/2 |
| 4,017,013 | 4/1977 | Hawk et al. | 225/96.5 |
| 4,036,419 | 7/1977 | Hensel et al. | 225/96.5 |
| 4,202,475 | 5/1980 | Hirai et al. | 225/2 |
| 4,213,550 | 7/1980 | Bonaddio | 225/2 |
| 4,274,572 | 6/1981 | Dunn et al. | 225/96.5 |
| 4,315,584 | 2/1982 | Wuestner | 225/2 |
| 4,322,025 | 3/1982 | Johnson | 225/96.5 |
| 4,351,459 | 9/1982 | Huey-Miin | 225/96.5 |
| 4,377,250 | 3/1983 | Muerkl | 225/2 |
| 4,418,855 | 12/1983 | Lamarche et al. | 225/96.5 X |
| 4,445,632 | 5/1984 | Margolin et al. | 225/2 |
| 4,473,942 | 10/1984 | Ridgway | 225/96.5 X |

OTHER PUBLICATIONS

"Optical Fiber End Preparation for Low-Loss Splices," D. Gloge, P. W. Smith, D. L. Bisbee and E. L. Chinnock, *The Bell System Technical Journal*, vol. 52, No. 9, Nov. 1973, pp. 1579–1588.
"Simplified Optical-Fibre Breaking Machine," P. Hensel, *Electronics Letters*, 27th Nov., 1975, vol. II, No. 24.
"Fibers Simple Testing Methods Give Users a Feel for Cable Parameters," R. B. Chester and F. W. Dabby, *Electronics*, Aug. 5, 1976, pp. 90–92.
"Fiber-Break Testing by Interferometry: A Comparison of Two Breaking Methods," K. S. Gordon, E. G. Rawson and A. B. Nafarrate, *Applied Optics*, Apr. 1977, vol. 16, No. 4, pp. 818–819.
"Splice Losses in Step-Index Fibers: Dependency on Fiber-Break Angle," K. S. Gordon, E. G. Rawson and R. E. Norton, *Applied Optics*, Sep. 1977, vol. 16, No. 9, pp. 2372–2374.
"Hand Held Tool to Cut and Prepare Fiber-Optic Waveguide Ends," E. Bossi, L. K. Schultz and C. A. Staples, *IBM Technical Disclosure Bulletin*, Sep. 1978, vol. 21, No. 4, pp. 1400–1401.
"Optical Fiber Cutting Tool," B. C. Uberbacher, *IBM Technical Disclosure Bulletin*, May 1979, vol. 21, No. 12, pp. 4947–4948.

*Primary Examiner*—Frank T. Yost
*Attorney, Agent, or Firm*—Joseph P. Calabrese; Donald R. Nyhagen; John T. Wiedemann

[57] ABSTRACT

An optical fiber severing device comprising a support for retaining a plurality of optical glass fibers in spaced relationship, scoring device for inflicting a flaw on the glass surface of each of the optical fibers providing each of the fibers with first and second portions on opposite sides of its flaw, a pressure mechanism for slidably engaging each of the fibers and applying pressure to a contacted area of each of the fibers, and a motive mechanism for applying respective tension forces between the first portions of the fiber and the pressure means and concurrently moving each of the fibers with respect to the pressure mechanism so that the contacted areas pass over the flaws as they move along the surface of the fibers from the first portions to the second portions. The method of the invention for concurrently severing a plurality of optical fibers comprises the steps of (a) inflicting a flaw on the glass surface of each of a plurality of optical glass fibers to be severed, (b) contacting an area about each of the fibers for applying pressure respectively to each of the fibers, and (c) applying pressure for producing respective frictional forces sufficient for severing the fibers and concurrently moving each of the contacted areas to which pressure is applied along their respective fibers and over their flaws to sever each of the fibers as its contacted area moves over its inflicted flaw.

33 Claims, 7 Drawing Figures

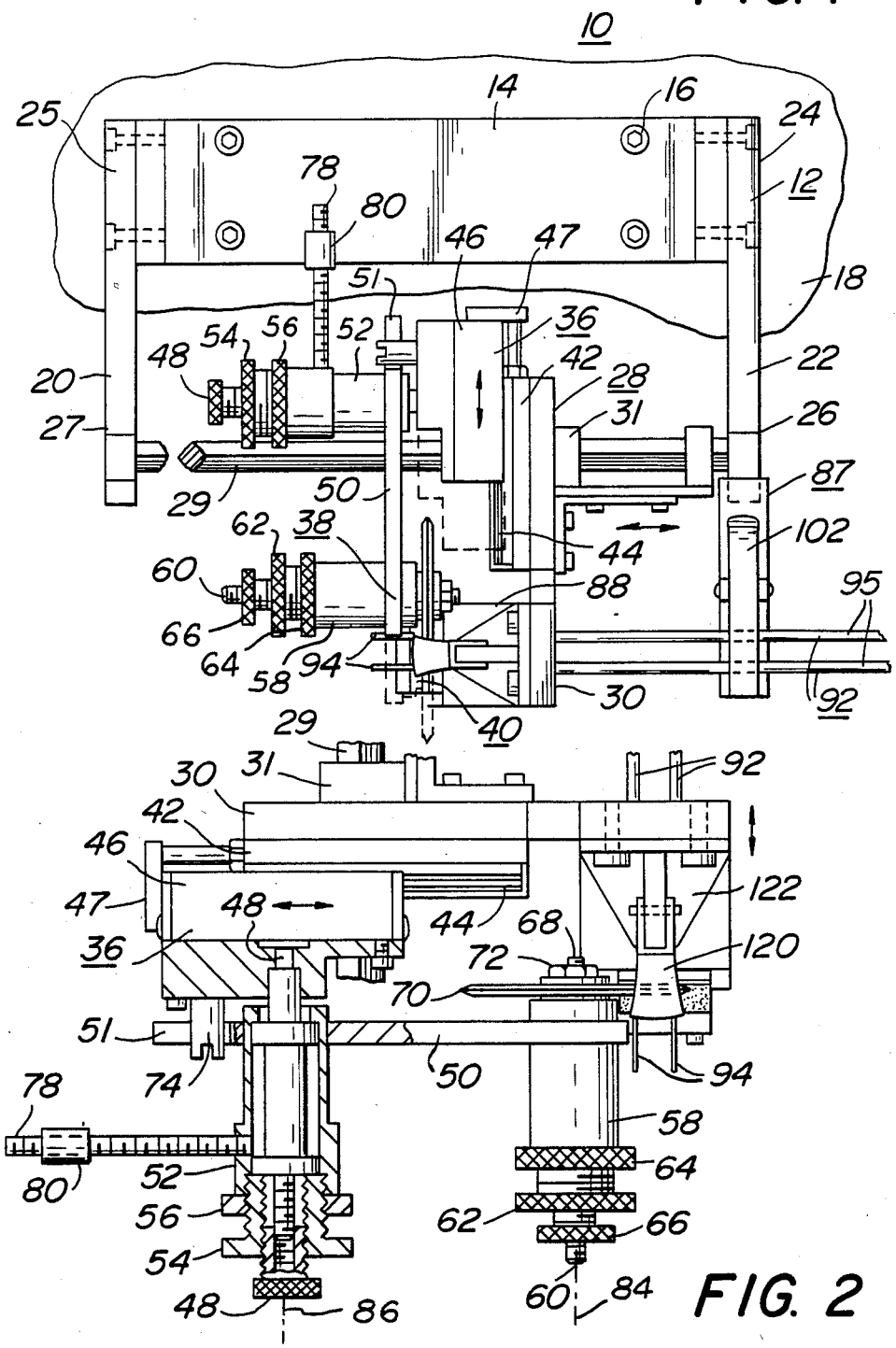

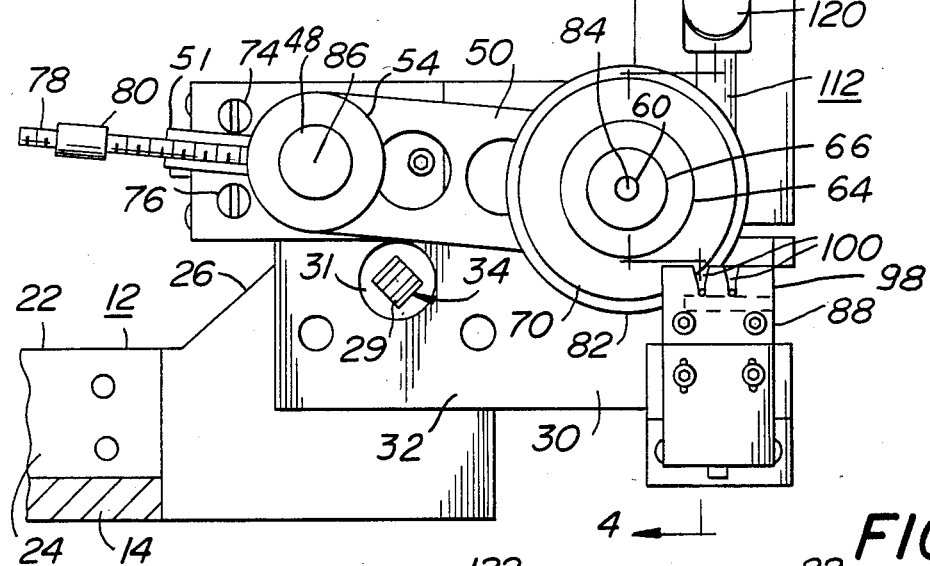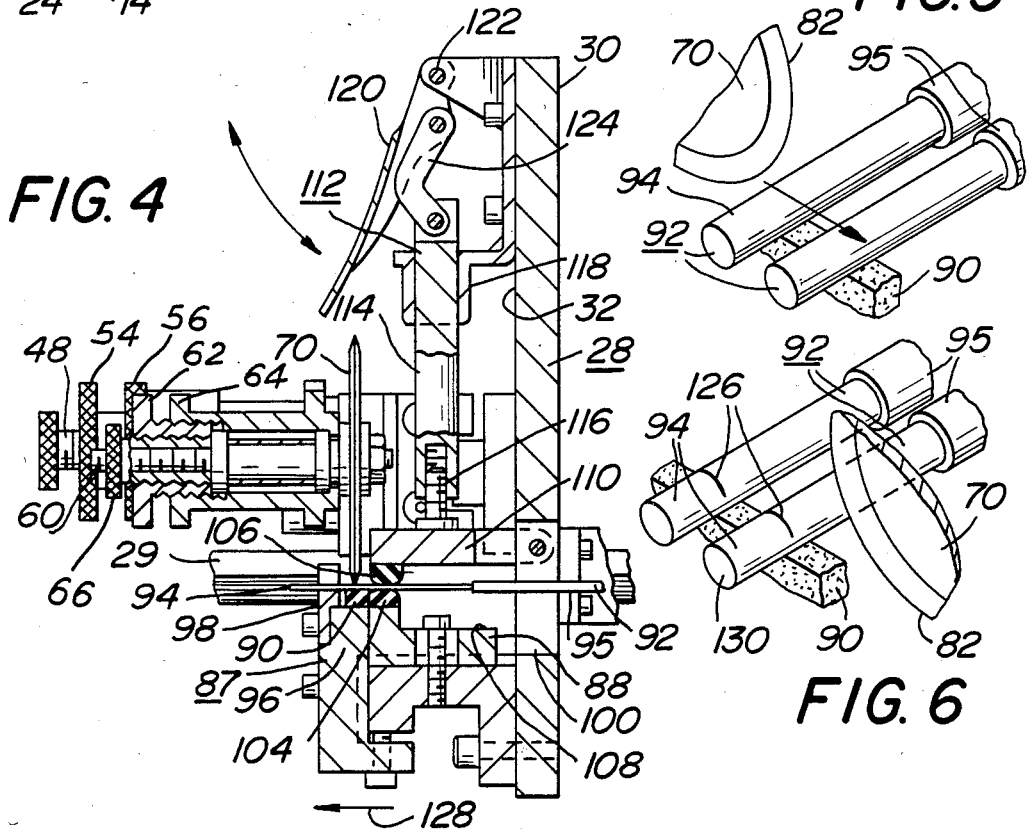

OPTICAL FIBER SEVERING DEVICE AND METHOD

BACKGROUND OF THE INVENTION

The invention relates to an optical fiber severing device and method, and particularly to a device and method for concurrently severing a plurality of optical fibers to provide each with an end having a mirror smooth face normal to the axis of the fiber.

Heretofore, methods and means have been provided for severing optical fibers to produce ends with mirror smooth surfaces for minimizing light transmission loss at interfaces. Such means and methods, however, have been complex and exacting, and have required that a flaw or defect be inflicted on the fiber as by scribing while tension is applied to the fiber and/or that different levels of tension be applied during the scribing and severing steps of the operation. Previous methods have also required that each fiber be singly scribed to provide a score mark and that each be individually tensioned to a predetermined extent for being severed at its score mark. Although it has been desirable to concurrently sever a plurality of parallel arranged fibers, apparatus has been required such as disclosed in U.S. Pat. No. 4,017,013 for adjusting the tensions applied to the fibers for proper stress distribution as individual fibers are severed at different times. Such apparatus has also required that the fibers each be clamped on opposite sides of its score mark for providing the breaking stress, thereby requiring a minimum length of fiber for producing smooth square surfaces at both ends so that the shortness of the length attainable was limited. Such techniques in addition to requiring extensive hardware can by inadvertent twisting of the fiber during fiber crack propogation, produce surface irregularities which result in the failure to provide good square breaks consistently.

SUMMARY OF THE INVENTION

It is, therefore, a principal object of the invention to provide a new and improved device and method for concurrently severing a plurality of optical fibers which are simple in nature and may be easily carried out during the manufacturing process as well as in the field for producing a fiber having ends with mirror smooth surfaces normal to the axis of the fiber.

Another object of the invention is to provide a new and improved device and method for concurrently severing a plurality of optical fibers which tensions each fiber individually and increases the tension until each fiber is severed, so that the tension applied to one fiber is not affected by the tension applied to the other fibers or by the number of fibers which have been severed.

Another object of the invention is to provide a new and improved device and method for concurrently severing a plurality of optical fibers to produce ends with mirror smooth surfaces without requiring that the fibers be tensioned between relatively fixed clamps during the severing operation.

Another object of the invention is to provide a new and improved device and method for severing one or more optical fibers which do not require the tensioning of the fibers during the process of inflicting the flaws on the fibers.

Another object of the invention is to provide a new and improved device and method of high reliability for singly or concurrently severing one or more optical fibers and consistently providing severed fiber ends with mirror smooth surfaces.

Another object of the invention is to provide a new and improved device and method for severing one or more optical fibers to produce one or more fibers of very small length each with ends having mirror smooth surfaces normal to the axis of the fiber.

Another object of the invention is to provide a new and improved device and method for singly or concurrently severing one or more optical fibers in which the removal of the outer protective coating over the glass surface of each of the fibers is not required for the severing operation.

Another object of the invention is to provide a new and improved device and method which may easily be used in manufacturing or in the field for producing mirror end faces for optical cable which are highly reliable and may easily be carried out under controlled or adverse circumstances.

The above as well as many other objects and advantages of the invention are achieved by the optical fiber severing device of the invention which comprises support means for retaining a plurality of optical glass fibers in spaced relationship, scoring means for inflicting a flaw on the glass surface of each of the optical fibers and providing each of the fibers with first and second portions on opposite sides of its flaw, pressure means for slidably engaging each of the fibers and applying pressure to a contacted area of each of the fibers, and motive means for applying respective tension forces between the fibers and the pressure means to concurrently move each of the fibers with respect to the pressure means so that the contacted areas pass over each of the inflicted flaws of the fibers as they move from the first portions to the second portions of the fibers. With the motion of the fibers relative to the pressure means, the pressure means produces a respective frictional force at each contacted area along the surface of each of the fibers. The frictional forces respectively applied to each of the first portions of the fibers decrease as each contacted area passes over its flaw, while the frictional forces applied respectively to each of the second portions of the fibers correspondingly increase. The frictional forces applied to the second portions of each of the fibers which are in opposition to the tension force produced by the motive means respectively increase until sufficient to sever each of the fibers at its inflicted flaw.

The pressure means comprises a pair of oppositely positioned resilient pad elements. The fibers are slidably received between the pad elements which apply compressive pressure to the contacted areas about the fibers. The pressure means includes biasing means which urges the pad elements toward each other for providing sufficient pressure to the fibers to result in frictional forces which sever the fibers at the inflicted flaws. The motive means includes clamping means for being secured with the first portions of the plurality of fibers and guide means for moving the pad elements along the fibers in a direction away from the first portions and toward the second portions of the fibers after flaws have been inflicted on each of the fibers, so that the contacted areas move over the flaws for severing the fibers.

The scoring means of the fiber severing device inflicts a flaw on each of the fibers prior to the fibers being tensioned by the motive means. The scoring means comprises blade means having a scribe wheel with an edge which inflicts the flaw by scribing a line on the surface of each of the fibers perpendicular to its longitudinal extending direction by moving in a direction transverse to and rolling over each of the fibers. The scoring means also includes bias means providing a downward force urging the edge of the wheel towards each of the fibers as it rolls over the fibers for controlling the pressure exerted by the edge of the wheel on the fibers. The pressure is provided by gravitational force acting on the mass of the scoring means associated with the scribe wheel and is adjusted by a counterweight which is positionable along a pivoted second portion of the scoring means.

The method of the invention for concurrently severing a plurality of optical fibers retained in spaced parallel relationship comprises the steps of (a) inflicting a flaw on the glass surface of each of a plurality of optical glass fibers to be severed, (b) contacting an area about each of the fibers, and (c) applying pressure to the contacted areas for producing respective frictional forces sufficient for severing the fibers and concurrently moving the contacted areas to which pressure is applied along their respective fibers and over their flaws to sever each of the fibers as its contacted area moves over its inflicted flaw. The term "flaw" as used herein designates a condition on the outer glass surface of an optical glass fiber such as a scribe mark, crack, or other defect provided for originating a break in the fiber, and as known in the prior art and referred to in the article entitled Optical Fiber End Preparation For Low-Loss Splices by D. Gloge, P. W. Smith, D. L. Bisbee, and E. L. Chinnock, published in *The Bell System Technical Journal*, Vol. 52, No. 9, November, 1973.

BRIEF DESCRIPTION OF THE DRAWING

The foregoing and other objects of the invention will become more apparent as the following detailed description of the invention is read in conjunction with the drawing, in which FIG. 1 is a top plan view of a device for concurrently severing a plurality of optical fibers embodying the invention, FIG. 2 is an enlarged view of a portion of FIG. 1, FIG. 3 is a left end view of the carriage of the device of FIG. 1 with supporting portions shown in section, FIG. 4 is a sectional view taken on the line 4—4 of FIG. 3, FIGS. 5 and 6 are perspective views of the scoring means of the device before and after inflicting flaws on the surfaces of several optical fibers, and FIG. 7 is a diagrammatic view illustrating the relative movement of optical fibers with respect to the pressure means of the device for concurrently severing the fibers.

Like reference numerals designate like parts throughout the several views.

DETAILED DESCRIPTION

Referring the the figures, FIG. 1 is a top plan view of an optical fiber severing device 10 having a base 12 comprising a horizontal bottom portion 14 secured by bolt means 16 with a horizontal mounting surface 18, and a pair of horizontally spaced side members 20, 22. The side members 20, 22 are transverse to the bottom portion 14 (see FIG. 3) and each have end 24, 25 secured with the bottom portion 14 of the base 12 and a second upwardly extending end 26, 27. A carriage support bar 29 of square cross-section is retained horizontally between the pair of side members 20 and 22 by having its ends secured with the second end portions 26, 27 of the side members 20, 22. A carriage 28 comprising a back plate 30 has a hub 31 with a square opening 34 for slidably receiving the bar 29 therethrough. The vertical face 32 of the back plate 30 has secured therewith a fiber severing assembly 36 for movement with the back plate 30 along the bar 29. The fiber severing assembly 36 comprises a fiber scoring means 38 and a fiber severing means 40 (FIG. 1).

The fiber scoring means 38 includes a guide portion 42 secured with the back plate 30 having track means 44 on upper and lower horizontal surfaces for retaining a block unit 46 for movement along the track means 44 in a direction transverse to the bar 29. A pivot rod 48 which has one end secured with the block unit 46 extends horizontally in a direction parallel to the bar 29 to retain a lever 50. The lever 50 has an end which is pivoted about the rod 48 and a projection 51 which extends between a pair of vertically spaced screw elements 74, 76, to limit the pivoting action of the lever 50 about the rod 48. The lever 50 also has a transversely extending tubular portion 52 with a concentrically threaded adjusting portion 54 and tightening means 56 for providing the lever 50 with a critically aligned and low resistance pivot about the rod 48. The other end of the lever 50 extends in the direction away from the bottom portion 14 of the base 12 and is also provided with a transversely extending tubular portion 58 having a rotatably mounted shaft 60 positioned and aligned by a threaded portion 62 and secured by locking members 64 and 66.

A scribe wheel 70 is secured by a nut 72 with the end 68 of the shaft 60 for rotation with the shaft 60. To allow adjustment of the downward force the tubular portion 52 of the lever 50 is also provided with a threaded extension 78 which is offset from, but parallel to, the lever 50 and carries a threadedly engaged counter-weight 80 which may be positioned therealong. A downward force is exerted by the mass of the lever 50, the tubular means 58, and scribe wheel 70 about the pivot point provided by the rod 48. As seen clearly in FIG. 3, the scribe wheel 70 which is provided with a cutting edge 82 is mounted to revolve freely about the horizontal axis 84 of the shaft 60. The scribe wheel 70 also moves downwardly in the clockwise direction about the horizontal axis 86 of the pivot shaft 48 with a force controlled by the counter balancing effect of the weight 80.

A cable support means 87 which comprises supporting brackets and block 88 is secured with the carriage back plate 30. The end portion 96 of the brackets and block 88 retains a resilient element 90 having a horizontal surface for supporting a plurality of optical glass fibers 92 and also provides an upstanding end section 98 having a pair of slot openings 100 for receiving therethrough and positioning the fibers 92 in parallel relationship. A portion of the outer protective covering of each of the fibers 92 is removed to provide the unsheathed portions 94 which are supported on the element 90 and extend through an opening 100 of the back plate 30 (see FIG. 4). The portions 95 of the fibers 92 which extend to the right from the opening 100 may be sheathed and are positioned transverse to and secured in parallel relationship with the side member 22 by a clamp 102 of the support means 87.

The unsheathed portions 94 of the fibers 92 which extend to the left are received between a pair of upper and lower resilient pad elements 104 and 106. The lower pad element 104 is supported on an upper surface of a portion 108 of the brackets and block 88 for contacting the optical fibers 92 along their lengths between the resilient element 90 of the fiber scoring means 40 and the opening 100. The upper pad element 106 is secured along the bottom surface of a hinged lever 110 for engaging the optical fibers 92 on the side opposite to the lower pad element 104. A pressure means 112 exerts downward pressure on the hinged lever 110 for compressing the optical fibers 92 between the upper and lower pad elements 104 and 106.

The pressure means 112 comprising a vertically extending shaft 114 having an adjustable threaded end portion 116 at its lower end. The shaft 114 is movable in a vertical direction through an opening in a bracket 118 which is secured with the back plate 30. A clamping handle 120 has an upper end which pivots about a pin 122 retained by the bracket 112 for movement downwardly in the counter clockwise direction to exert force on the top end of the shaft 114 through a link element 124. The full downward movement of the handle 112 locks it in position so that a predetermined pressure is exerted on the contacted areas of the fibers 92 between the pads 104 and 106.

In the operation of the device 10, the back plate 30 of the carriage 28 is moved to the right along the bar 29 to the position shown in FIG. 1, and the block unit 46 of the scoring means 36 is moved along track means 44 of the guide portion 42 to engage the stop 47. A plurality of optical fibers 92 which may have casements or outer coverings 95, have portions of their coverings removed to provide the unsheathed portions 94. The handle 120 of the pressure means 112 is also moved upwardly to remove pressure from the hinged lever 110 so that the upper pad 106 can be moved away from the lower pad 104. This allows the optical fibers 92 to be received and positioned in parallel relationship between the pads 104 and 106. The optical fibers extend transversely over the side member 22 and through the opening 100 of the base plate 30 to be received through the slot openings 100 while resting on the top surfaces of the element 90 and the lower pad 104. Portions of the optical fibers which may be sheathed are received between the jaws of the clamp means 102 and secured therewithin. The handle 120 of the pressure means 112 may also be moved downwardly at this time to retain the fibers between the upper and lower pad elements 104 and 106.

With the fibers positioned in parallel relationship, the block unit 46 is moved from its first extreme position at the stop 47 (FIG. 1) toward the optical fibers 92. With this movement, the wheel 70 moves transversely to and rolls over the fibers 92 as shown in FIGS. 5 and 6. It is also urged downwardly by the force produced by its mass and that of the lever 50 which is not completely balanced by the counter weight 80 and scribes score marks 126 on the outer surfaces of the fibers 92. Because of the rolling action and the precisely controlled pressure exerted by the edge 82 of the wheel 70 as it rolls over the outer surfaces of the fibers 92, highly controlled transverse score marks 126 of the desired extent and depth are attained. Thus, in the case of optical fibers which have a thin protective layer or coating over their glass surfaces, the pressure can be accurately adjusted so that the edge 82 of the wheel 70 penetrates the protective coating and inflicts a flaw of the desired extent on the outer glass surface of each of the fibers. The flaws inflicted are uniform and accurately controlled by adjusting the position of the counter weight 80 and also by the retention of the fibers 92 on the resilient upper surface of the element 90 which accommodates any slight variations which may be present in the fibers or their protective coatings.

After the score marks or flaws 126 are inflicted on the glass outer surfaces of the fibers 92, the carriage back plate 30 is moved along its supporting bar 29 toward the side member 20. Since the fibers 92 are secured by the clamp 102 with the side member 22, the movement of the back plate 30 to the left as indicated by the arrows 128 of FIGS. 4 and 7 provides relative movement of the lower and upper pad elements 104 and 106 with respect to the optical fibers 92. With the exertion of pressure by the pad elements 104, 106 on the contacted areas of the plurality of fibers 92, frictional forces are developed in the direction opposing the relative motion along the fibers 92.

In considering the action of the lower and upper pads 104, 106 for severing the fibers 92, the motion of the back plate 30 to the left, produces tension forces which are exerted respectively on each of the fibers 92. These forces result from the retention by the clamp 102 of each of the fibers, while the movement of pressure means 112 with respect to the fibers produces frictional forces which act on each of the fibers 92 opposing such motion. When the areas of the fibers contacted by the pads 104 and 106 are to the right of the score marks 126, forces are exerted only to the right of the score marks 126 and not on opposite sides of the score marks 126. However, as a score mark 126 moves between the pads 104 and 106 as shown in FIG. 7, frictional forces are also exerted on the portions of the fibers to the left of the score mark 126. The frictional forces exerted on the portion of the fiber to the left of the score mark 126 increase as the contacted area moves along the fiber 92 to the left of the score mark 126. The frictional forces to the left of the score marks 126 oppose the forces provided by the clamping means 102 retaining the fibers 92 from moving in the direction of the carriage back plate 30. As the contacted areas of the pads 104, 106 continue to move to the left of the score marks 126, the forces tending to sever the fibers 92 increase until they reach values which cause the fibers to sever. Since the forces exerted on each of the fibers for causing the severing action, are the result of frictional forces produced by the relative movement of the pads 104, 106 along each of the fibers and over the score marks, the severing of one of the fibers does not affect the frictional or severing forces applied to the remaining fibers. The forces applied to each of the fibers may also vary depending upon the pressure applied, the frictional coefficient value, variations in size of the contacted area, and also variations in the positions of the scribe marks. However, such variations with regard to one of the fibers does not affect the forces applied to the other fibers, so there is no requirement for adjusting or equalizing the forces applied to each of the fibers, or reducing the forces applied to the remaining fibers upon the severing of individual fibers in order to provide desired severing forces. The device 10 and the method for severing the fibers also act to control the forces exerted upon each of the fibers for obtaining the severing action and allow the applied forces to be gradually increased until the required severing forces are attained, which forces may be different for the respective fibers being concurrently severed. The operation and method, thus, automatically takes into account variations in the structure of the fibers and the requirements for severing a plurality of fibers, to accommodate such variations and allow the severing of the fibers individually by concurrently operating on a plurality of fibers while obtaining accurate and desirable mirror surfaces transverse to the longitudinal axis of the fibers.

The scoring means, also allows one fiber or a plurality of parallel arranged fibers to be scribed accurately by a controlled scoring means which is adjustable to take into consideration various factors which may vary from one optical fiber to another. The invention provides for the scoring or inflicting of flaws on one or a plurality of optical fibers so that the severing operation may be carried out immediately following the scoring action without rearrangement or other manipulation of the fibers. Accurate control of the length of the fibers, particularly where a plurality of fibers of substantially equal length are to be produced is readily achieved. Fibers of very short length are produced by providing one score mark 126 to sever the fibers 92 at one end with a mirror surface 130, while another score mark 126', as shown in FIG. 7, is provided at a desired distance from the first for providing the second mirror face between the closely spaced score marks. Several severing operations, as described in accordance with the method, thus, may be repeated one after the other for producing mirror end surfaces 130 at one end of an optical fiber or at both opposite ends of optical fibers of very short or long lengths as required.

Although the embodiment of the device 10 illustrates the arrangement and concurrent severing of only a pair of optical fibers 92, it is noted that this is illustrative only and that a greater number of fibers may be arranged in parallel and severed in accordance with the apparatus and method of the invention.

Many other advantages of the invention will be obvious to those skilled in the art, and many modifications or variations thereof accomplishing the foregoing objects and realizing many or all of the advantages but which do not depart essentially from the spirit of the invention are within the scope of the invention and the claims provided hereinbelow.

What is claimed is:

1. An optical fiber severing device comprising support means for retaining a plurality of optical glass fibers in spaced relationship, scoring means for inflicting a flaw on the glass surface of each of the optical fibers providing each of the fibers with first and second portions on opposite sides of its flaw, pressure means for slidably engaging each of the fibers and applying pressure to a contacted area of each of the fibers, and motive means for applying respective tension forces between the first portions of the fiber and the pressure means and concurrently moving each of the fibers with respect to the pressure means so that the contacted areas pass over the flaws as they move along the surfaces of the fibers from the first portions to the second portions, the pressure means producing frictional forces with the relative motion of the fibers at the respective contacted areas along each of the fiber surfaces in the direction opposing the motion, the frictional forces respectively applied to the first portions of each of the fibers decreasing as each contacted area passes over its flaw while the frictional forces respectively applied to the second portions of each of the fibers correspondingly increase in opposition to the tension forces applied to the first portions of the fibers, the frictional forces respectively applied to the second portions of the fibers each increasing until sufficient to sever its fiber at the flaw.

2. The fiber severing device of claim 1 in which the pressure means comprises a pad element for slidably engaging each of the fibers at its contacted area and applying pressure to each of the fibers.

3. The fiber severing device of claim 2 in which the motive means includes means for moving the pad element along the fibers in the direction away from first portions of the fibers so that the respective contacted areas move concurrently over their flaws for respectively severing their fibers.

4. The fiber severing device of claim 1 in which the pressure means comprises a pair of oppositely positioned resilient pad elements for slidably receiving each of the spaced fibers therebetween and applying pressure thereabout to the contacted area of each fiber.

5. The fiber severing device of claim 4 in which the pressure means includes biasing means for urging the pad elements toward each other and controlling the pressure applied to the fibers by the pad elements for severing the fibers.

6. The fiber severing device of claim 4 in which at least one of the resilient pad elements contacting each of the fibers is conditioned so that the pressure applied to the contacted area of the fibers by the pads increases over a region through which the flaw of each fiber moves for severing the fibers.

7. The fiber severing device of claim 4 in which the supporting means includes clamping means for securing the first portions of each of the fibers, and the motive means includes guide means for moving the pad elements with respect to the first portions of the fibers so that the respective contacted areas concurrently move along the fibers and over their flaws for respectively severing each of the fibers.

8. The fiber severing device of claim 7 in which the motive means provides for continuously moving the pad elements away from the first portions and over the flaws of the fibers for severing each of the fibers.

9. The fiber severing device of claim 8 in which the pressure means includes biasing means providing force for urging the pad elements toward each other and controlling the pressures applied to the fibers by the pad elements for severing each of the fibers.

10. The fiber severing device of claim 1 in which the support means positions the fibers in parallel spaced relationship, and the scoring means includes blade means for inflicting the flaw by traversing the fibers and providing on each fiber a scribed line which is perpendicular to the longitudinally extending direction of each of the fibers.

11. The fiber severing device of claim 1 in which the scoring means comprises a scribe wheel mounted for rolling over the fiber for inflicting the flaws by scribing a line on each of the surfaces of the fibers.

12. The fiber severing device of claim 11 in which the severing means includes a body having a surface which supoorts at least a portion of each of the fibers, and the scribe wheel of the scoring means is a circular disk having a sharp peripheral scribing edge rotatably mounted about its center for rolling over the surface of the body and the fibers supported thereon in a direction transverse to the longitudinally extending direction of the fibers for scribing the transverse line on the surface of each of the fibers.

13. The fiber severing device of claim 12 in which the scribe wheel of the scoring means as it rolls over each fiber is movable in the direction toward the fiber and the body supporting the fiber for exerting pressure on each of the fibers with its scribing edge, and the scoring means includes bias means providing force for urging the edge of the wheel toward each of the fibers as its rolls over the fiber for controlliing the pressure exerted by the wheel on the fiber for scribing the line on the surface of each of the fibers.

14. The fiber severing device of claim 13 in which the force of the bias means is provided by gravitational force acting on the mass of the scoring means associated with the scribe wheel for scribing the fibers.

15. The fiber severing device of claim 11 in which the scoring means includes a lever movable about a pivot and having first and second portions on opposite sides of its pivot, and the wheel is rotatably mounted on the first portion of the lever for rolling over each of the fibers and being movable toward each fiber to exert pressure on the fibers with the pivoting of the lever under the urging of the bias means.

16. The fiber severing device of claim 15 in which the force of the bias means is provided by gravitational force acting on the mass of the scoring means associated with the first portion of the lever subject to the countering effect of the mass associated with the second portion of the lever, and the bias means includes a counter weight positionable along the second portion of the lever for adjusting the pressure exerted by the wheel for scribing the surfaces of the fibers.

17. The fiber severing device of claim 15 in which the scoring means includes a unit mounted for movement between first and second positions in a direction transverse to the longitudinally extending direction of the fibers, the lever is pivotally secured with the unit for movement therewith, and the wheel is urged by the bias means in a direction about the pivot of the lever for scribing the fibers as the unit moves from its first to its second positions with the edge of the wheel rolling over the surfaces of the fibers.

18. The fiber severing device of claim 17 in which the scoring means includes a body with a resilient surface which supports at least a portion of each of the fibers, the scribe wheel rolls over the surface of the body and the fibers for scribing the lines on the fibers, the force of the bias means is provided by gravitational force acting on the mass of the scoring means associated with the first portion of the lever subject to the countering effect of the mass associated with the second portion of the lever, and the bias means includes a counter weight positionable along the second portion of the lever for adjusting the pressure exerted by the wheel for scribing the surfaces of the fibers.

19. A method of concurrently severing a plurality of optical fibers comprising the steps of (a) inflicting a flaw on the glass surface of each of a plurality of optical glass fibers to be severed, (b) contacting an area about each of the fibers for applying pressure respectively to each of the fibers, and (c) applying pressure for producing respective frictional forces sufficient for severing the fibers and concurrently moving each of the contacted areas to which pressure is applied along their respective fibers and over their flaws to sever each of the fibers as its contacted area moves over its inflicted flaw.

20. The method of claim 19 in which each of the fibers is contacted by and pressure is applied thereto by a pad element.

21. The method of claim 20 in which in step (c) the pad element is moved with respect to the fibers for concurrently moving the contacted areas along the fibers over their flaws for severing the fibers.

22. The method of claim 19 in which in step (b) each of the fiber is contacted and pressure is applied thereto by being placed between a pair of oppositely positioned resilient pad elements.

23. The method of claim 22 in which in step (b) the pressure applied to each of the fibers is controlled by the application of force to the pad elements urging them toward each other.

24. The method of claim 22 in which the surface of at least one of the pad elements contacting the fibers is conditioned so that the pressure applied to the fibers by the pads increases over a region through which the flaws move for severing the fibers.

25. The method of claim 22 in which in step (c) each of the fibers has a portion which is secured against movement and the pad elements are moved away from the fixed portions for moving the contacted areas along the fibers over the flaws for severing the fibers.

26. The method of claim 25 in step (c) each of the fibers is moved with respect to the pad elements for continuously moving the contacted areas of the fibers over the flaws for severing the fibers.

27. The method of claim 26 in which the pressure applied to each of the fibers is controlled by the application of force to the pad elements urging them toward each other.

28. The method of claim 19 in which in step (a) the flaws are inflicted on each of the fibers by blade means which scribes a line on the surface of each of the fibers which is perpendicular to its longitudinally extending direction.

29. The method of claim 19 in which the flaw is inflicted on the surface of each of the optical fibers by rolling a scribe wheel having a sharp peripheral edge over the surface and scribing a transverse line on each of the fibers.

30. The method of claim 29 in which the scribe wheel is moved in a transverse direction to the fiber to scribe on the fibers lines which are respectively perpendicular to the longitudinally extending direction of each of the fibers.

31. The method of claim 30 in which at least a portion of each of the fibers is supported on the surface of a body and the wheel is a disk with a circular scribing edge turning about its center for rolling over the surface of the body and the fibers supported thereon for scribing the transverse lines on the surfaces of each of the fibers, and the pressure exerted by the edge of the wheel for scribing the line on each fiber is controlled by the application of force urging the wheel toward the fiber.

32. The method of claim 31 in which the body has a resilient surface for supporting the fibers, and the wheel as it rolls over the fibers is movable toward and away from the fiber and its supporting surface for controlling the pressure exerted by the wheel on each of the fibers.

33. The method of claim 31 in which the pressure exerted by the wheel on the fibers is provided by gravitational force acting on the mass associated with the scribe wheel.

* * * * *